(12) United States Patent
Nakashima et al.

(10) Patent No.: US 10,508,586 B2
(45) Date of Patent: Dec. 17, 2019

(54) AIR-COOLED ENGINE

(71) Applicant: KUBOTA Corporation, Osaka-shi, Osaka (JP)

(72) Inventors: Eishin Nakashima, Sakai (JP); Kiyoharu Kimoto, Sakai (JP); Mineo Takasaki, Sakai (JP); Masaharu Ohno, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 827 days.

(21) Appl. No.: 14/960,475

(22) Filed: Dec. 7, 2015

(65) Prior Publication Data
US 2016/0290213 A1 Oct. 6, 2016

(30) Foreign Application Priority Data

Mar. 31, 2015 (JP) ................. 2015-072621

(51) Int. Cl.
*F01P 1/02* (2006.01)
*F01M 9/08* (2006.01)
(Continued)

(52) U.S. Cl.
CPC ............... *F01P 1/02* (2013.01); *F01M 9/08* (2013.01); *G01K 1/16* (2013.01); *F01P 11/08* (2013.01);
(Continued)

(58) Field of Classification Search
CPC .. F01P 1/02; F01P 2001/023; F01P 2001/026; F01P 11/08; F01P 1/06;
(Continued)

(56) References Cited

U.S. PATENT DOCUMENTS

| | | | |
|---|---|---|---|
| 2007/0227502 A1* | 10/2007 | Takami | F02D 1/162 123/366 |
| 2008/0127914 A1* | 6/2008 | Nakashima | F01P 5/06 123/41.65 |

(Continued)

FOREIGN PATENT DOCUMENTS

| | | |
|---|---|---|
| JP | 2003176721 A | 6/2003 |
| JP | 2003343309 A | 12/2003 |

(Continued)

OTHER PUBLICATIONS

Office Action dated Mar. 20, 2018 in JP 2015-072621.

*Primary Examiner* — Lindsay M Low
*Assistant Examiner* — Omar Morales
(74) *Attorney, Agent, or Firm* — Panitch Schwarze Belisario & Nadel LLP

(57) ABSTRACT

An air-cooled engine capable of enhancing detection precision of a temperature sensor includes a crankcase, a crankshaft, a fan case, and an engine cooling fan. The installation direction of the crankshaft defines the front and rear direction. The fan case is provided in a front part of the crankcase, and the engine cooling fan is accommodated in the fan case. The air-cooled engine includes a cooling wind passage, a wind passage terminal end wall, an oil splashing device, and a temperature sensor. The wind passage terminal end wall is provided in a rear end of the cooling wind passage, the oil splashing device is provided on the rear side of the wind passage terminal end wall and formed to splash engine oil in the crankcase onto the wind passage terminal end wall, and the temperature sensor is attached to a front part of the wind passage terminal end wall.

20 Claims, 5 Drawing Sheets

(51) Int. Cl.
*G01K 1/16* (2006.01)
*F01P 11/08* (2006.01)
*F02B 77/08* (2006.01)
*F02B 75/22* (2006.01)
*F02B 63/02* (2006.01)

(52) U.S. Cl.
CPC ............... *F02B 63/02* (2013.01); *F02B 75/22* (2013.01); *F02B 77/085* (2013.01); *G01K 2205/00* (2013.01)

(58) Field of Classification Search
CPC ..... F01P 1/08; F01P 1/10; F01M 9/06; F01M 9/08; F01M 9/102; F02B 63/02; F02B 75/22; G01K 2205/00
USPC ............................................ 123/41.15, 41.12
See application file for complete search history.

(56) References Cited

U.S. PATENT DOCUMENTS

| | | | | |
|---|---|---|---|---|
| 2013/0182743 | A1* | 7/2013 | Nishi | G01K 1/14 374/144 |
| 2014/0202428 | A1* | 7/2014 | Mavinahally | F02M 37/00 123/434 |

FOREIGN PATENT DOCUMENTS

| | | | |
|---|---|---|---|
| JP | 2007177679 A | 7/2007 | |
| JP | 2008138614 A | 6/2008 | |

\* cited by examiner

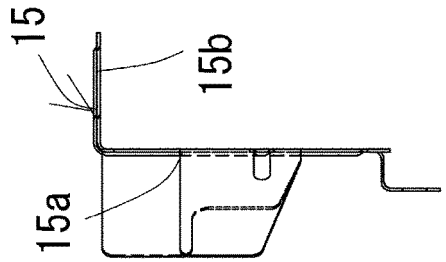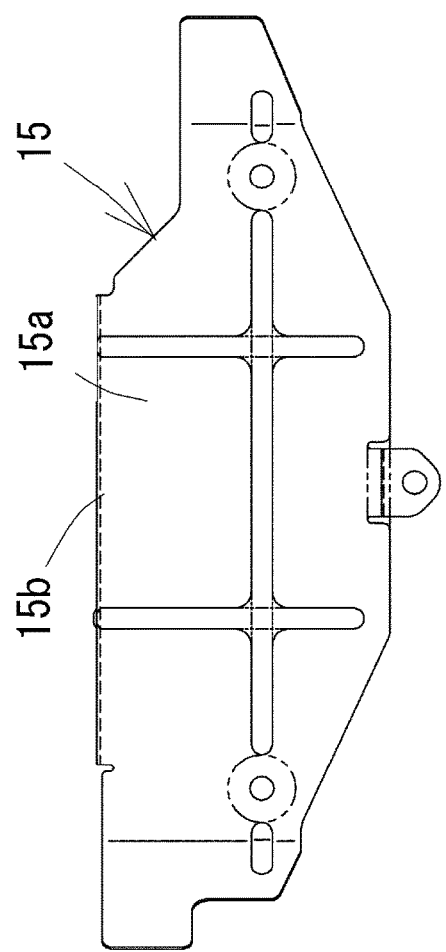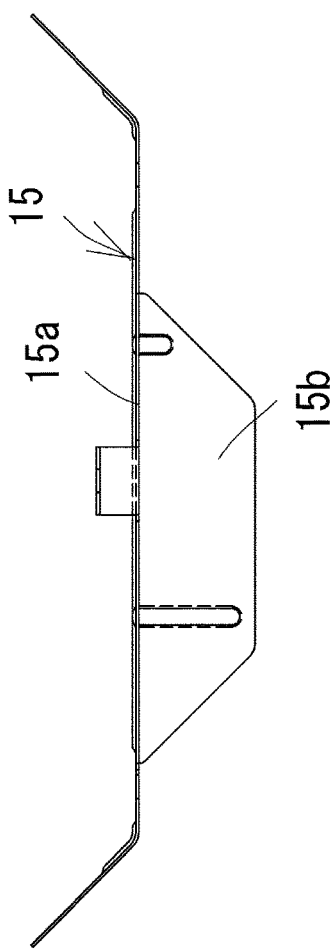

AIR-COOLED ENGINE

BACKGROUND OF THE INVENTION (1) Field of the Invention

The present invention relates to an air-cooled engine.

(2) Description of Related Art

A temperature sensor is often arranged in a fan case in a conventional air-cooled engine.

Problem

There is sometimes a case where detection precision of the temperature sensor is lowered.

In the conventional air-cooled engine, a change in an outdoor air temperature becomes a disturbance factor, and the detection precision of the temperature sensor is sometimes lowered.

SUMMARY OF THE INVENTION

An object of the present invention is to provide an air-cooled engine in which detection precision of a temperature sensor is high.

Particular matters of the present invention are as follows.

An air-cooled engine including a crankcase, a crankshaft, a fan case, and an engine cooling fan, wherein with the installation direction of the crankshaft serving as the front and rear direction, one side of the front and rear direction serving as the front side, and the other side serving as the rear side, the fan case is provided in a front part of the crankcase, and the engine cooling fan is accommodated in the fan case, the air-cooled engine including a cooling wind passage, a wind passage terminal end wall, an oil splashing device, and a temperature sensor, wherein the wind passage terminal end wall is provided in a rear end of the cooling wind passage, the oil splashing device is provided on the rear side of the wind passage terminal end wall and formed to splash engine oil in the crankcase onto the wind passage terminal end wall, and the temperature sensor is attached to a front part of the wind passage terminal end wall.

The present invention exerts the following effect.

Effects

Detection precision of the temperature sensor can be enhanced.

By detecting a temperature of the engine oil with which a change in an outdoor air temperature does not easily become a disturbance factor with the temperature sensor attached to the wind passage terminal end wall insusceptible to engine cooling wind, the detection precision of the temperature sensor can be enhanced.

BRIEF DESCRIPTION OF THE DRAWINGS

FIG. 1A is a vertically sectional side view of an upper part of a crankcase, and FIG. 1B is a sectional view taken along the line B-B of FIG. 1A;

FIGS. 5A to 5C are views for illustrating a shielding plate used in the engine of FIG. 2, FIG. 5A is a plan view, FIG. 5B is a front view, and FIG. 5C is a side view.

DETAILED DESCRIPTION OF PREFERRED EMBODIMENTS

FIGS. 1A to 5C are views for illustrating an engine according to an embodiment of the present invention. In this embodiment, a V2 air-cooled gasoline engine will be described.

An outline of the engine of this embodiment is as follows.

Figure 2:
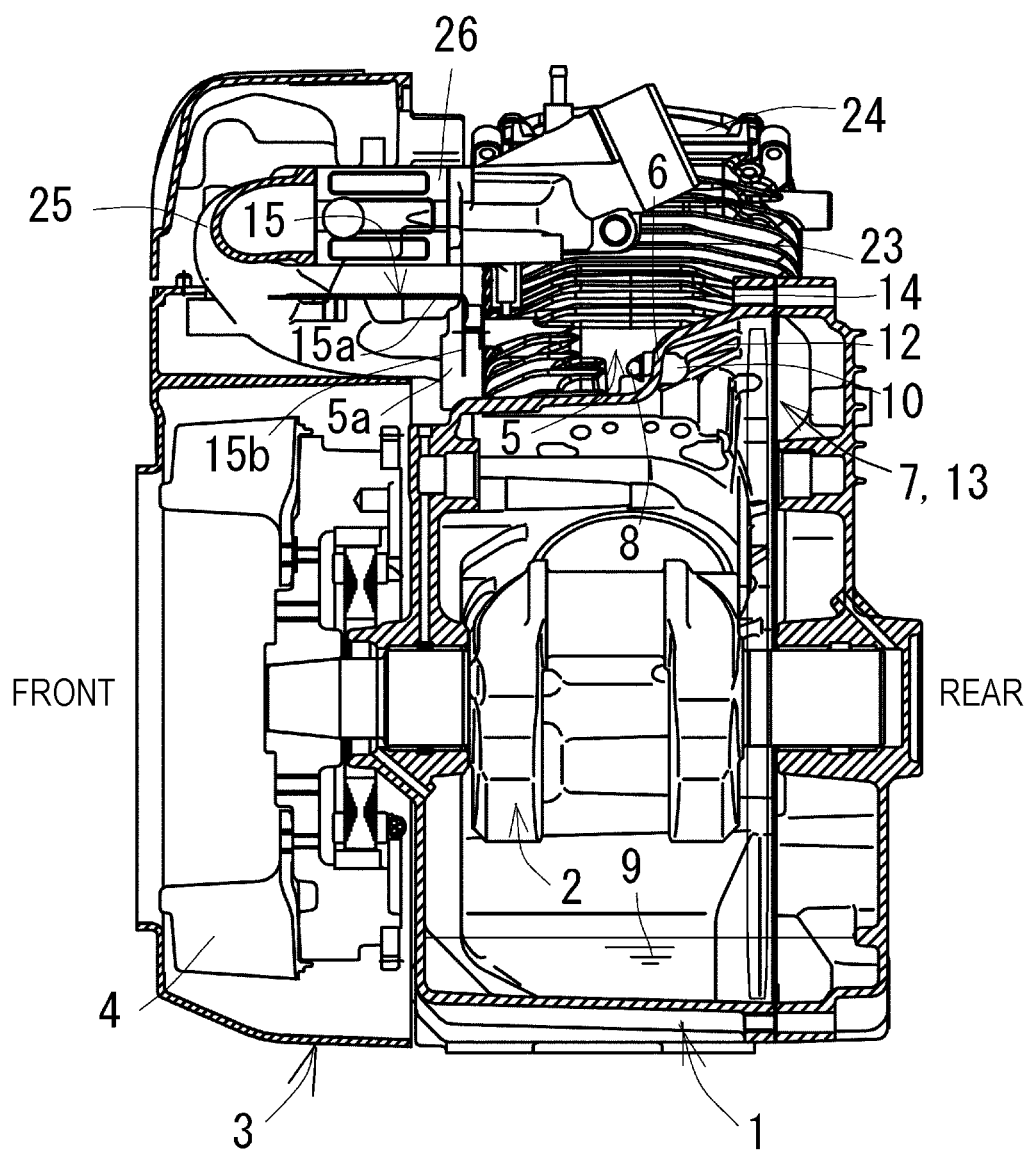
FIG. 2 is a vertically sectional side view of the engine according to the embodiment of the present invention.

As shown in FIG. 2, this engine includes a crankcase (1), a crankshaft (2), a fan case (3), and an engine cooling fan (4). With the installation direction of the crankshaft (2) serving as the front and rear direction, one side of the front and rear direction serving as the front side, and the other side serving as the rear side, the fan case (3) is provided in a front part of the crankcase (1), and the engine cooling fan (4) is accommodated in the fan case (3). Therefore, the engine can be simply cooled by the engine cooling fan (4).

Figure 1A:
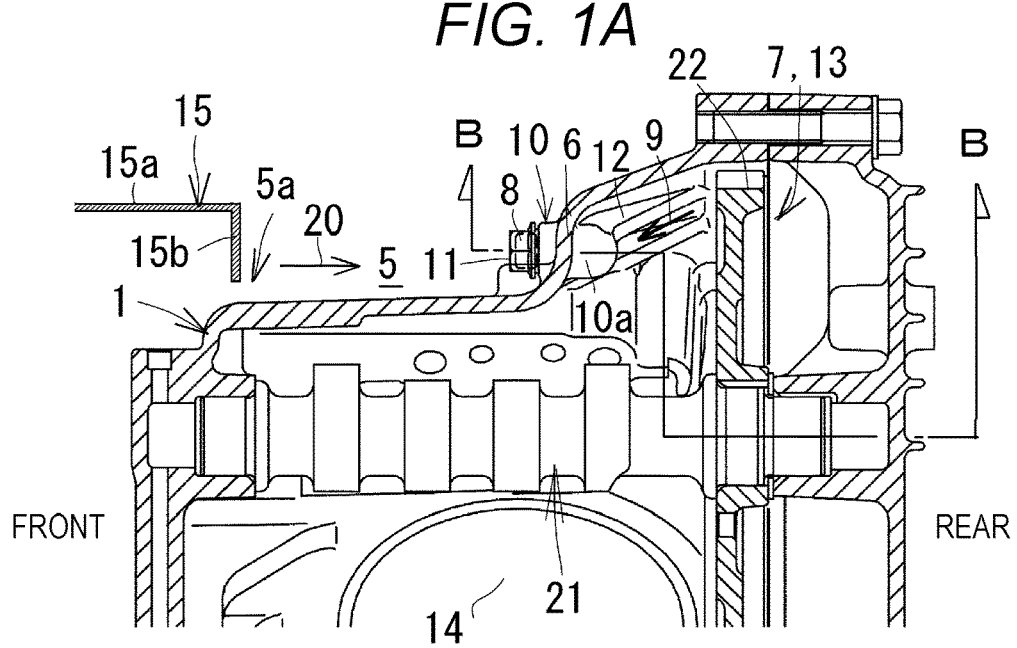
FIGS. 1A and 1B are views for illustrating an engine according to an embodiment of the present invention.
Figure 1B:
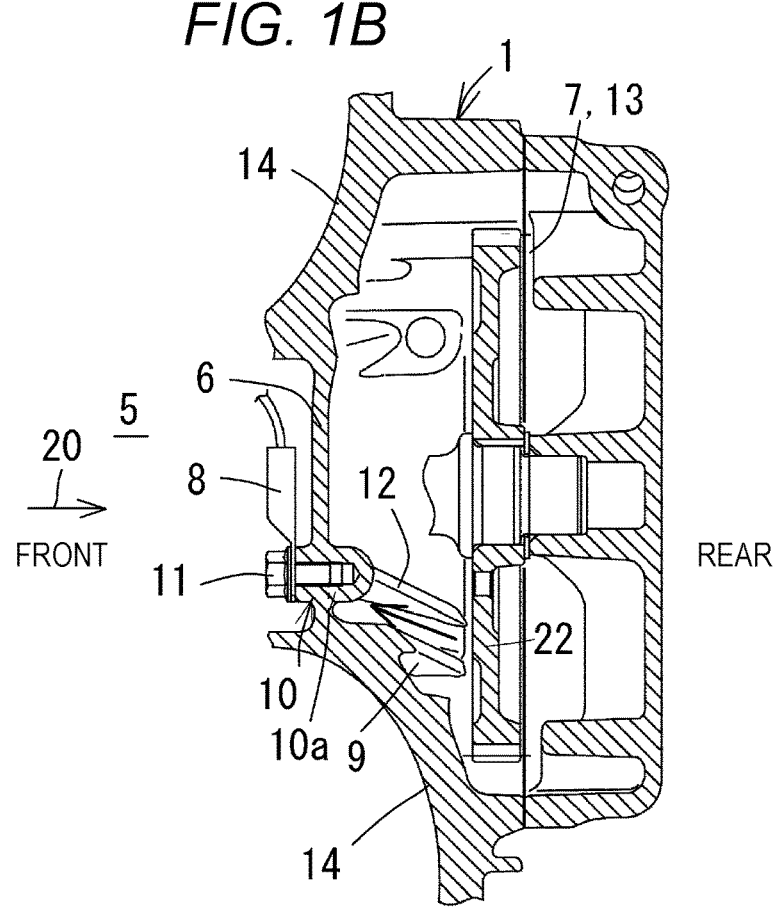

As shown in FIGS. 1A and 1B, the engine includes a cooling wind passage (5), a wind passage terminal end wall (6), an oil splashing device (7), and a temperature sensor (8). The wind passage terminal end wall (6) is provided in a rear end of the cooling wind passage (5), the oil splashing device (7) is provided on the rear side of the wind passage terminal end wall (6) and formed to splash engine oil (9) in the crankcase (1) onto the wind passage terminal end wall (6), and the temperature sensor (8) is attached to a front part of the wind passage terminal end wall (6).

Therefore, by detecting a temperature of the engine oil (9) with which a change in an outdoor air temperature does not easily become a disturbance factor with the temperature sensor (8) attached to the wind passage terminal end wall (6) insusceptible to engine cooling wind (20), detection precision of the temperature sensor (8) can be enhanced.

A thermistor is used as the temperature sensor (8).

As shown in FIGS. 1A and 1B, the engine includes a sensor attachment boss (10), and a sensor attachment bolt (11). The sensor attachment boss (10) is provided in the wind passage terminal end wall (6), a rear part (10a) of the sensor attachment boss (10) projects rearward from the wind passage terminal end wall (6), the sensor attachment bolt (11) is screwed into the sensor attachment boss (10), and the temperature sensor (8) is attached to the sensor attachment boss (10) by this sensor attachment bolt (11).

Therefore, the engine oil (9) is brought into contact with the rear part (10a) of the sensor attachment boss (10) having a large surface area, and the temperature of the engine oil (9) is smoothly transmitted to the temperature sensor (8) via the sensor attachment boss (10) and the sensor attachment bolt (11), so that a function of enhancing the detection precision of the temperature sensor (8) is high.

As shown in FIGS. 1A and 1B, the engine includes an oil guiding rib (12), and the oil guiding rib (12) projects rearward from the wind passage terminal end wall (6) and is formed to guide the engine oil (9) splashed by the oil splashing device (7) to the rear part (10a) of the sensor attachment boss (10).

Therefore, the engine oil (9) is brought into contact with the oil guiding rib (12) and guided to the rear part (10a) of the sensor attachment boss (10), and the temperature of the engine oil (9) is smoothly transmitted to the sensor attachment boss (10), so that the function of enhancing the detection precision of the temperature sensor (8) is high.

Rigidity of the wind passage terminal end wall (6) is enhanced by the oil guiding rib (12) and vibration of the temperature sensor (8) is reduced. Therefore, the function of enhancing the detection precision of the temperature sensor (8) is also high in this point.

As shown in FIGS. 1A and 1B, a timing transmission device (13) is also used as the oil splashing device (7). Therefore, there is no need for providing an exclusive oil splashing device (7), so that the number of parts can be reduced.

The timing transmission device (13) is a timing transmission gear train that transmits mechanical power of the crankshaft (2) to a valve cam shaft (21). The engine oil (9) accumulated on an inner bottom of the crankcase (1) is taken up by this timing transmission device (13) and splashed onto the wind passage terminal end wall (6) by a valve cam gear (22).

Figure 3:
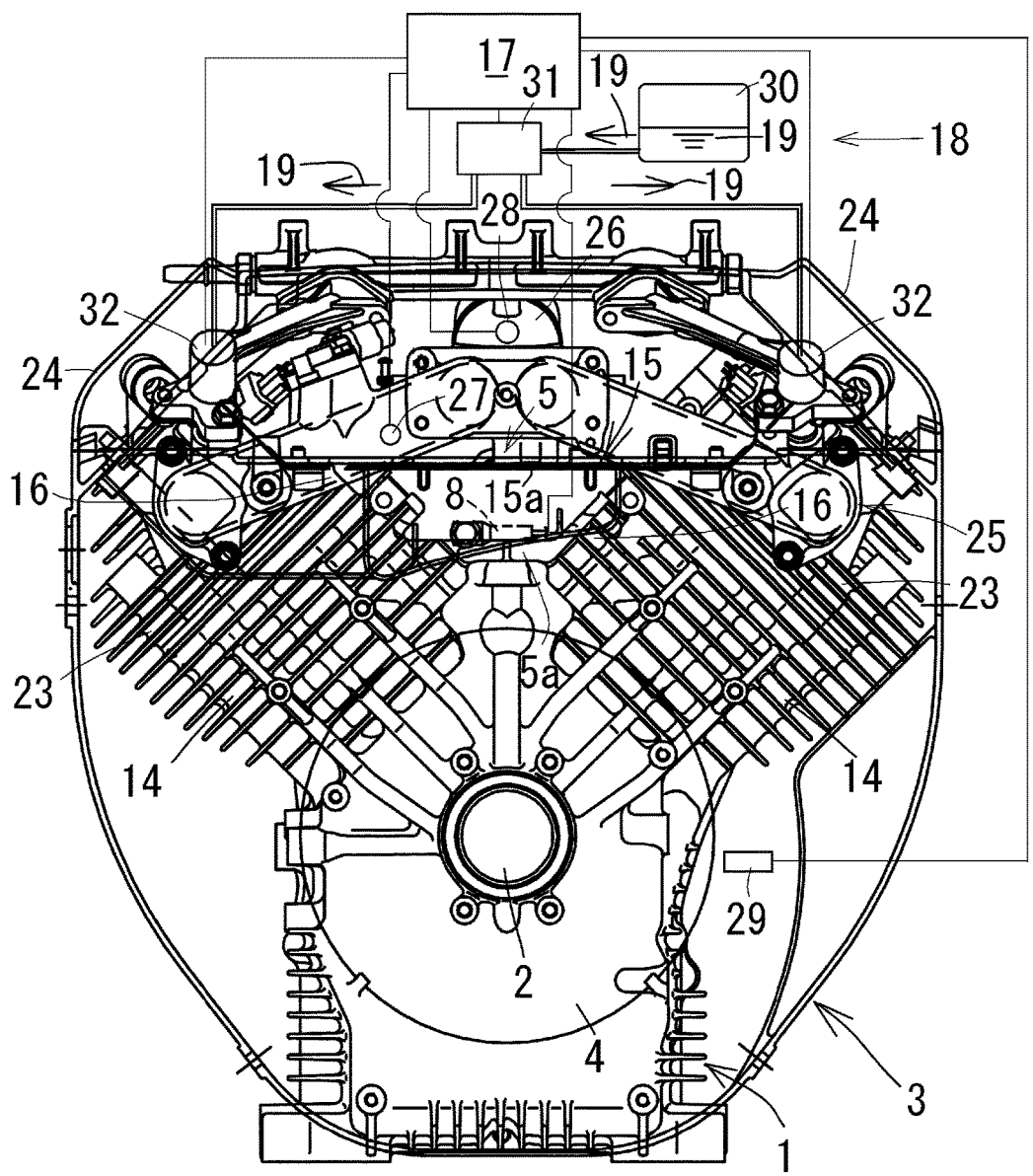
FIG. 3 is a vertically sectional front view of the engine of FIG. 2.

As shown in FIG. 3, the engine includes left and right cylinders (14) (14), the left and right cylinders (14) (14) project obliquely upward from the crankcase (1) to form a V shape when seen in the direction parallel to the installation direction of the crankshaft (2), and the cooling wind passage (5) is provided between the left and right cylinders (14) (14), and as shown in FIG. 1A, the wind passage terminal end wall (6) projects upward from the crankcase (1). Therefore, a structure for detecting the temperature of the engine oil (9) by the temperature sensor (8) can be applied to a V-type engine.

Figure 4:
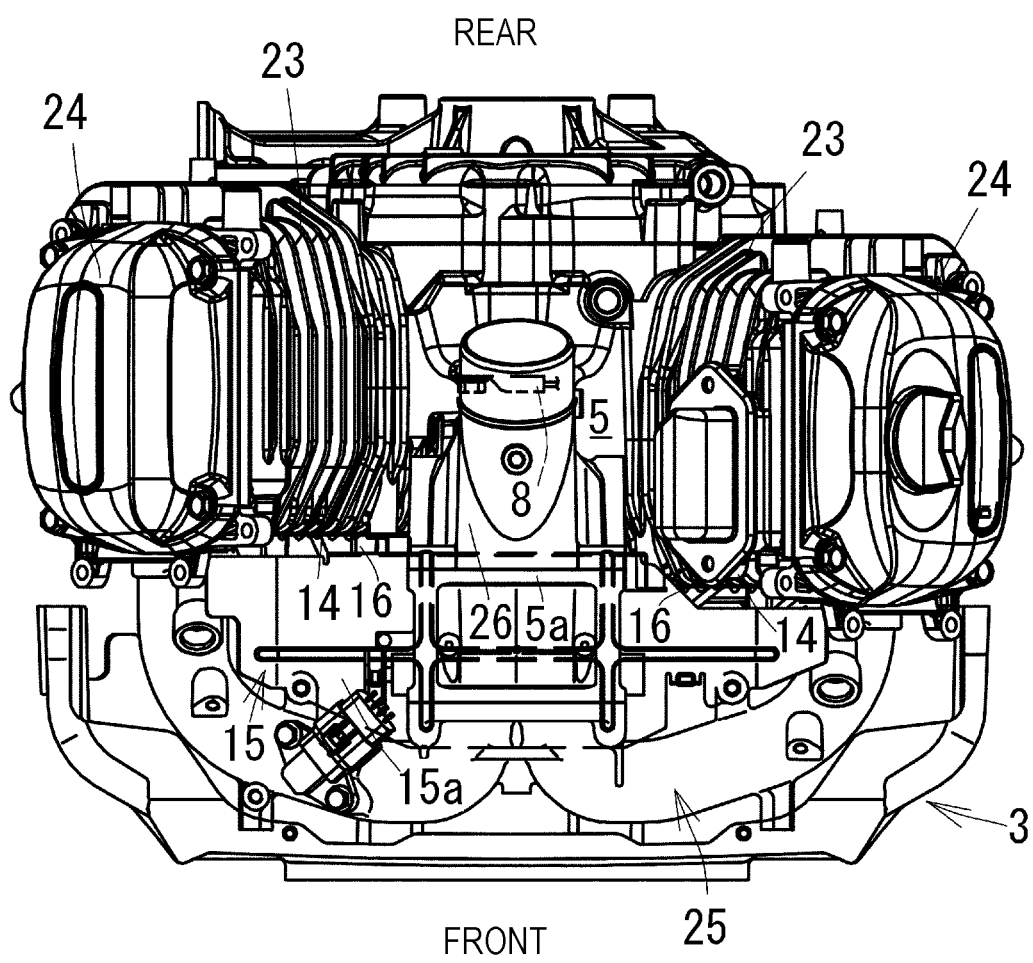
FIG. 4 is a plan view of the engine of FIG. 2.

As shown in FIG. 3, a cylinder head (23) is assembled to a projecting end of each of the left and right cylinders (14) (14), and a cylinder head cover (24) is respectively assembled to an upper part of the cylinder head (23). An intake manifold (25) is assembled between front parts of the cylinder heads (23) (23). As shown in FIGS. 2 to 4, a throttle body (26) is assembled on the rear side of a center part of the intake manifold (25).

As shown in FIGS. 1 to 4, the engine includes a wind shielding plate (15), and the wind shielding plate (15) is provided in an inlet (5a) of the cooling wind passage (5), and as shown in FIG. 3, the temperature sensor (8) is arranged at a position to be hidden behind the wind shielding plate (15) when seen from the front side in the direction parallel to the installation direction of the crankshaft (2). Therefore, the temperature sensor (8) is less susceptible to the engine cooling wind (20), so that the function of enhancing the detection precision of the temperature sensor (8) is high.

As shown in FIGS. 3 and 4, cooling wind introduction gaps (16) (16) are provided between the wind shielding plate (15) and circumferential walls of the left and right cylinders (14) (14). Therefore, the engine cooling wind (20) is concentratedly supplied to the circumferential walls of the left and right cylinders (14) (14) from the cooling wind introduction gaps (16) (16), so that cooling efficiency of the left and right cylinders (14) (14) is enhanced.

As shown in FIGS. 2 to 4, the wind shielding plate (15) includes atop plate part (15a) extending in an upper part of the fan case (3). Therefore, at the time of assembling the engine or the time of maintenance, parts can be prevented from dropping off into the fan case (3).

A suspended plate part (15b) is suspended from a rear edge part of the top plate part (15a), and the temperature sensor (8) is arranged at a position to be hidden behind this suspended plate part (15b).

The top plate part (15a) of the wind shielding plate (15) as shown in FIGS. 2 to 4 is made of a magnetic material. Therefore, metal parts such as bolts are absorbed by magnetic force of the top plate part (15a) of the wind shielding plate (15), so that a function of preventing the parts from dropping off into the fan case (3) is high.

As shown in FIG. 3, this engine includes a control device (17), and a fuel supply device (18). The fuel supply device (18) is coordinated with the temperature sensor (8) via the control device (17), and the control device (17) is formed to adjust an amount of fuel (19) supplied to a combustion chamber by the fuel supply device (18) based on a temperature detected by the control device (17) via the temperature sensor (8). Therefore, based on temperature detection with high precision, fuel supply can be performed with high precision.

As shown in FIG. 3, this engine also includes an intake pressure sensor (27), an intake temperature sensor (28), and an engine rotation number sensor (29). The fuel supply device (18) is also coordinated with these sensors (27) (28) (29) via the control device (17), and an intake amount is calculated based on intake pressure, an intake temperature, and the engine rotation number detected by the control device (17) via these sensors (27) (28) (29).

The intake pressure sensor (27) is attached to the intake manifold (25), the intake temperature sensor (28) is attached to the throttle body (26), and the engine rotation number sensor (29) is attached to the fan case (3).

As shown in FIG. 3, the control device (17) adjusts the amount of the fuel (19) supplied to the combustion chamber by the fuel supply device (18) in accordance with the calculated intake amount, supplies the fuel (19), and makes the mixed air have a predetermined air-fuel ratio.

The fuel supply device (18) includes a fuel tank (30), a fuel supply pump (31), and fuel injectors (32), and the fuel injectors (32) are attached to the intake manifold (25).

The control device (17) is an engine ECU. The engine ECU is an abbreviated term for an engine electric control unit, which is a microcomputer.

It should be noted that an opening degree of a throttle valve of the throttle body (26) is adjusted by a mechanical governor (not shown).

What is claimed is:

1. An air-cooled engine comprising:
   a crankcase;
   a crankshaft;
   a fan case; and
   an engine cooling fan, wherein
   with the installation direction of the crankshaft serving as the front and rear direction, one side of the front and rear direction serving as the front side, and the other side serving as the rear side, the fan case is provided in a front part of the crankcase, and the engine cooling fan is accommodated in the fan case,
   the air-cooled engine comprising:
   a temperature sensor and an oil splashing device, the temperature sensor being attached to a front part of a cooling air passage terminal end wall and coordinated with a fuel supply device adjusting an amount of a fuel supply via an electronic control device, and the oil splashing device splashing engine oil in the crankcase onto the cooling air passage terminal end wall to which the temperature sensor is attached.

2. The air-cooled engine according to claim 1, comprising:
   a sensor attachment boss; and
   a sensor attachment bolt, wherein
   the sensor attachment boss is provided in the wind passage terminal end wall, a rear part of the sensor attachment boss projects rearward from the wind passage terminal end wall, the sensor attachment bolt is screwed into the sensor attachment boss, and the temperature sensor is attached to the sensor attachment boss by the sensor attachment bolt.

3. The air-cooled engine according to claim 2, comprising:
an oil guiding rib, wherein
the oil guiding rib projects rearward from the wind passage terminal end wall and is formed to guide the engine oil splashed by the oil splashing device to the rear part of the sensor attachment boss.

4. The air-cooled engine according to claim 1, wherein
a timing transmission device is also used as the oil splashing device.

5. The air-cooled engine according to claim 1, comprising:
left and right cylinders, wherein
the left and right cylinders project obliquely upward from the crankcase to form a V shape when seen in the direction parallel to the installation direction of the crankshaft, the cooling wind passage is provided between the left and right cylinders, and the wind passage terminal end wall projects upward from the crankcase.

6. The air-cooled engine according to claim 5, comprising:
a wind shielding plate, wherein
the wind shielding plate is provided in an inlet of the cooling wind passage, and the temperature sensor is arranged at a position to be hidden behind the wind shielding plate when seen from the front side in the direction parallel to the installation direction of the crankshaft.

7. The air-cooled engine according to claim 6, wherein
cooling wind introduction gaps are provided between the wind shielding plate and circumferential walls of the left and right cylinders.

8. The air-cooled engine according to claim 6, wherein
the wind shielding plate includes a top plate part extending in an upper part of the fan case.

9. The air-cooled engine according to claim 8, wherein
the top plate part of the wind shielding plate is made of a magnetic material.

10. The air-cooled engine according to claim 1, wherein
the electronic control device is formed to adjust an amount of fuel supplied to a combustion chamber by the fuel supply device based on a temperature detected by the electronic control device via the temperature sensor.

11. The air-cooled engine according to claim 2, wherein
a timing transmission device is also used as the oil splashing device.

12. The air-cooled engine according to claim 3, wherein
a timing transmission device is also used as the oil splashing device.

13. The air-cooled engine according to claim 2, comprising:
left and right cylinders, wherein
the left and right cylinders project obliquely upward from the crankcase to form a V shape when seen in the direction parallel to the installation direction of the crankshaft, the cooling wind passage is provided between the left and right cylinders, and the wind passage terminal end wall projects upward from the crankcase.

14. The air-cooled engine according to claim 3, comprising:
left and right cylinders, wherein
the left and right cylinders project obliquely upward from the crankcase to form a V shape when seen in the direction parallel to the installation direction of the crankshaft, the cooling wind passage is provided between the left and right cylinders, and the wind passage terminal end wall projects upward from the crankcase.

15. The air-cooled engine according to claim 4, comprising:
left and right cylinders, wherein
the left and right cylinders project obliquely upward from the crankcase to form a V shape when seen in the direction parallel to the installation direction of the crankshaft, the cooling wind passage is provided between the left and right cylinders, and the wind passage terminal end wall projects upward from the crankcase.

16. The air-cooled engine according to claim 11, comprising:
left and right cylinders, wherein
the left and right cylinders project obliquely upward from the crankcase to form a V shape when seen in the direction parallel to the installation direction of the crankshaft, the cooling wind passage is provided between the left and right cylinders, and the wind passage terminal end wall projects upward from the crankcase.

17. The air-cooled engine according to claim 12, comprising:
left and right cylinders, wherein
the left and right cylinders project obliquely upward from the crankcase to form a V shape when seen in the direction parallel to the installation direction of the crankshaft, the cooling wind passage is provided between the left and right cylinders, and the wind passage terminal end wall projects upward from the crankcase.

18. The air-cooled engine according to claim 13, comprising:
a wind shielding plate, wherein
the wind shielding plate is provided in an inlet of the cooling wind passage, and the temperature sensor is arranged at a position to be hidden behind the wind shielding plate when seen from the front side in the direction parallel to the installation direction of the crankshaft.

19. The air-cooled engine according to claim 14, comprising:
a wind shielding plate, wherein
the wind shielding plate is provided in an inlet of the cooling wind passage, and the temperature sensor is arranged at a position to be hidden behind the wind shielding plate when seen from the front side in the direction parallel to the installation direction of the crankshaft.

20. The air-cooled engine according to claim 15, comprising:
a wind shielding plate, wherein
the wind shielding plate is provided in an inlet of the cooling wind passage, and the temperature sensor is arranged at a position to be hidden behind the wind shielding plate when seen from the front side in the direction parallel to the installation direction of the crankshaft.

* * * * *